United States Patent
Hoyos

(10) Patent No.: US 11,722,484 B2
(45) Date of Patent: Aug. 8, 2023

(54) UTILIZING VOICE BIOMETRICS TO ADDRESS COERCION OF AN AUTHORIZED USER OF A SECURE DEVICE BY A NEFARIOUS ACTOR

(71) Applicant: HOYOS INTEGRITY CORPORATION, Fort Lauderdale, FL (US)

(72) Inventor: Hector Hoyos, Ridgefield, CT (US)

(73) Assignee: HOYOS INTEGRITY CORPORATION, Fort Lauderdale, FL (US)

( * ) Notice: Subject to any disclaimer, the term of this patent is extended or adjusted under 35 U.S.C. 154(b) by 404 days.

(21) Appl. No.: 16/355,828

(22) Filed: Mar. 17, 2019

(65) Prior Publication Data

US 2020/0296094 A1    Sep. 17, 2020

Related U.S. Application Data

(60) Provisional application No. 62/818,634, filed on Mar. 14, 2019.

(51) Int. Cl.
*G06F 21/00* (2013.01)
*H04L 9/40* (2022.01)
*G10L 17/06* (2013.01)
*G10L 17/00* (2013.01)

(52) U.S. Cl.
CPC ......... *H04L 63/0861* (2013.01); *G10L 17/00* (2013.01); *G10L 17/06* (2013.01); *H04L 63/102* (2013.01)

(58) Field of Classification Search
CPC ... H04L 63/0861; H04L 63/102; G10L 17/00; G10L 17/06; G06F 21/554; G06F 21/32
See application file for complete search history.

(56) References Cited

U.S. PATENT DOCUMENTS

| | | | |
|---|---|---|---|
| 8,644,896 B1* | 2/2014 | Bock | H01P 1/2039 505/210 |
| 10,943,463 B1* | 3/2021 | Clark | G08B 21/0208 |
| 2010/0161338 A1* | 6/2010 | Tofighbakhsh | G10L 17/00 704/273 |
| 2016/0328949 A1* | 11/2016 | Zhong | G08B 25/016 |

(Continued)

*Primary Examiner* — Jeffrey C Pwu
*Assistant Examiner* — William A Corum, Jr.
(74) *Attorney, Agent, or Firm* — Sheridan Ross P.C.

(57) ABSTRACT

A system comprising a secure computer system, a network-enabled secure end-user device, and a coercion security system. The secure computer system can host secure services and/or sensitive data. The secure end-user device can utilize a secure device architecture that requires biometric authentication of an authorized user for access. The coercion security system can have an application running on the secure end-user device. The coercion security system can be configured to capture and analyze verbal communication proximate to the secure end-user device to address coercion of the authorized user by a nefarious actor to access the secure computer system and/or the secure end-user device. Without coercion of the authorized user, the nefarious actor can be unable to access the secure end-user device and/or the secure computer system. The coercion security system can executes one or more security commands upon the secure end-user device in response to detected coercion.

20 Claims, 4 Drawing Sheets

(56) References Cited

U.S. PATENT DOCUMENTS

| | | | |
|---|---|---|---|
| 2019/0020676 A1* | 1/2019 | Laughlin | H04L 63/1416 |
| 2020/0152205 A1* | 5/2020 | Sayyadi-Harikandehei | G10L 17/06 |
| 2020/0244650 A1* | 7/2020 | Burris | G10L 17/06 |
| 2020/0258088 A1* | 8/2020 | Bermudez | G06Q 20/407 |

* cited by examiner

UTILIZING VOICE BIOMETRICS TO ADDRESS COERCION OF AN AUTHORIZED USER OF A SECURE DEVICE BY A NEFARIOUS ACTOR

BACKGROUND

The present invention relates to the field of end-user device security, and more particularly to utilizing voice biometrics to address coercion of an authorized user of a secure end-user device by an external actor.

Most end-user devices (e.g., smartphones, laptops, notebook computers, tablets, etc.) include a variety of security measures to prevent use by unauthorized persons. These security measures typically take the form of specialized hardware and/or software that allow only those people and programs (e.g., services, Web sites, etc.) that an authorized user or owner of the end-user device to access all or a specified portion of the end-user device.

The use of biometrics in end-user device security continues to gain in popularity. Biometric security is considered to provide the highest degree of protection for a system against the impersonation of authorized users. However, it is still unable to protect against an authorized user being coerced to access a biometrically-secured end-user device and/or computer system. That is, biometric security protects the contents of a biometrically-secured end-user device from direct access by a nefarious actor, but does not protect the biometrically-secured end-user device from indirect access by the nefarious actor through coercion of its authorized user.

Therefore, what is needed is a biometric security approach that addresses indirect access by an unauthorized user (i.e., nefarious actor). Such a solution would utilize voice biometrics from verbal communications proximate to the end-user device in determining the presence of a nefarious actor.

BRIEF SUMMARY

One aspect of the present invention can include a system comprised of a secure computer system, a network-enabled secure end-user device, and a coercion security system. The secure computer system can be accessed via a biometric authentication gateway and can host secure services and/or sensitive data. The secure end-user device can utilize a secure device architecture that requires successful biometric authentication of an authorized user by the biometric authentication gateway for functions of the secure end-user device and the secure services and sensitive data of the secure computer system to be accessed. The secure device architecture can encapsulate software programs requiring a similar security level into distinct partitions to prevent intrusions between software programs of different partitions. Each partition can be allocated a distinct set of dedicated device resources. The coercion security system can have an application running on the secure end-user device. The coercion security system can be configured to capture and analyze verbal communication proximate to the secure end-user device to address coercion of the authorized user by a nefarious actor to access the secure computer system and/or the secure end-user device. Without coercion of the authorized user, the nefarious actor can be unable to access the secure end-user device and/or the secure computer system. The coercion security system can executes one or more security commands upon the secure end-user device in response to detected coercion.

Another aspect of the present invention can include a method for addressing user coercion that begins with the monitoring of verbal communications made proximate to a secure end-user device by a client application of a coercion security system for the presence of an unauthorized user, while the secure end-user device is being accessed. Voice biometric data for authorized users of the secure end-user device can be collected in a voice biometric library during registration with the coercion security system. The secure end-user device can implement a secure device architecture that encapsulates software programs requiring a similar security level into distinct partitions to prevent intrusions between software programs of different partitions; each partition can be allocated a distinct set of dedicated device resources. Access to the secure end-user device can be controlled by biometric authentication of the authorized user, prohibiting direct access to the secure end-user device by the unauthorized user. When the presence of the unauthorized user is detected in voice data corresponding to the verbal communications, one or more security commands can be determined as a means to address the potential coercion of the authorized user by the unauthorized user. The determined security commands can be executed on the secure end-user device.

Yet another aspect of the present invention can include a computer program product that includes a computer readable storage medium having embedded computer usable program code. The computer usable program code can be configured to, in response to an activation command, monitor verbal communications made proximate to a secure end-user device for the presence of an unauthorized user. Voice biometric data for authorized users of the secure end-user device can be collected in a voice biometric library during a registration process. The secure end-user device can implement a secure device architecture that encapsulates software programs requiring a similar security level into distinct partitions to prevent intrusions between software programs of different partitions; each partition can be allocated a distinct set of dedicated device resources. Access to the secure end-user device can be controlled by biometric authentication of an authorized user, prohibiting direct access to the secure end-user device by the unauthorized user. The computer usable program code can be configured to, when the presence of the unauthorized user is detected in voice data corresponding to the verbal communications, determine one or more security command as a means to address potential coercion of the authorized user by the unauthorized user. The computer usable program code can be configured to then execute the determined one or more security command on the secure end-user device.

DETAILED DESCRIPTION

Figure 1:
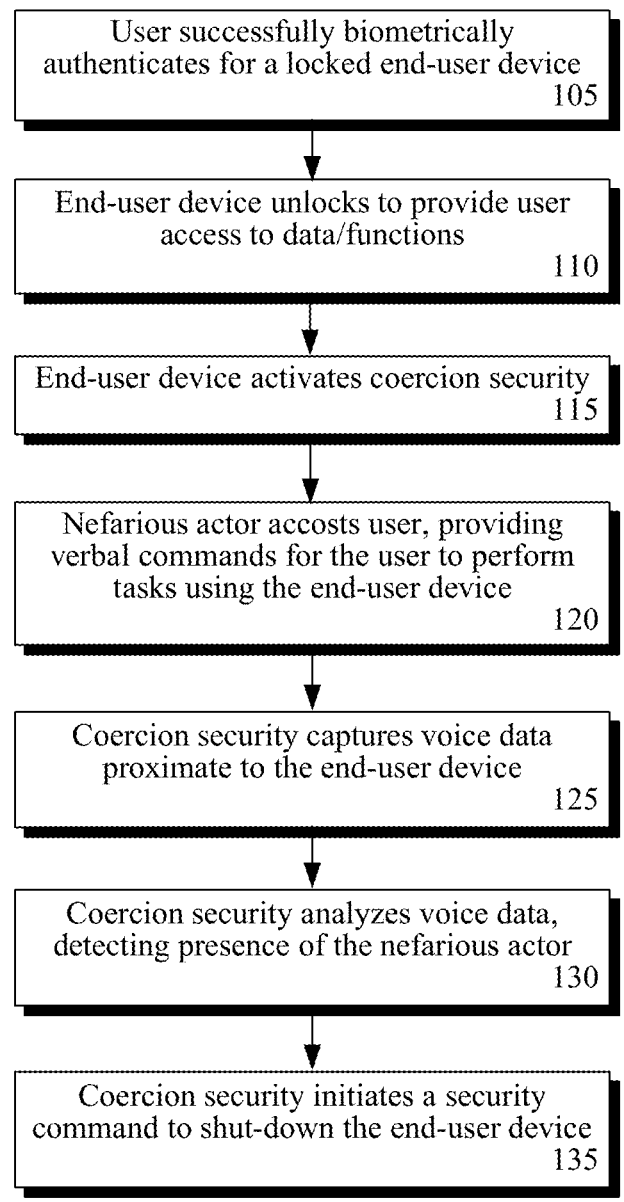
FIG. 1 is a flowchart of a method describing the general use of a coercion security application on an end-user device in accordance with embodiments of the inventive arrangements disclosed herein.

Embodiments of the disclosed invention can present a solution for handling the coercion of an authorized user of a secure end-user device by a nefarious actor using voice biometrics. A coercion security application can run local to the user's end-user device to capture voice data from the area proximate to the end-user device. The voice data can be analyzed to determine the presence of a nefarious actor. One or more security commands can then be executed on the end-user device, in response to the presence of a nefarious actor.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 is a flowchart of a method 100 describing the general use of a coercion security application on an end-user device in accordance with embodiments of the inventive arrangements disclosed herein. The coercion security application can have been previously installed on the end-user device and configured by the user.

Method 100 can begin with step 105 where a user successfully biometrically authenticates for a locked end-user device. The end-user device can then unlock, in step 110, to provide the user with access to its functions and/or data. In step 115, the end-user device can activate the coercion security system, specifically a coercion security application that runs local to the end-user device. Step 115 can represent the coercion security application actively monitoring the end-user device for threats. Prior to step 115, the coercion security application could have been in a suspended state (i.e., running on the end-user device but not actively monitoring) or not already running on the end-user device.

A nefarious actor can accost the user and provide the user with verbal commands to perform tasks using the end-user device in step 120. The nefarious actor can be an unauthorized user, a user that is not registered with the coercion security system, or a registered user that is not associated with the specific end-user device, typically with malicious intentions. As such, the nefarious actor cannot perform step 105 to gain access to the end-user device on their own. In step 125, the coercion security application can capture voice data that is spoken proximate to the end-user device.

The captured voice data can be analyzed by the coercion security application or system to detect the presence of the nefarious actor in step 130. In step 135, the coercion security application/system can initiate a security command to shutdown the end-user device, terminating the nefarious actor's access to the end-user device. Steps 130 and 135 can be expanded to encompass more in-depth analyzes and complex security commands executed by the coercion security system.

For example, voice biometric data for known nefarious actors can be compiled for use by the coercion security system. In such an embodiment, step 130 can compare the voice data against the voice biometric data of nefarious actors to ascertain their identity.

Further, different sets of security commands can be associated with different nefarious actors. For example, the coercion security system can initiate location services on the end-user device to track location if nefarious actor A is present and only limit the functionality of the end-user device if nefarious actor Z is present.

Figure 2:
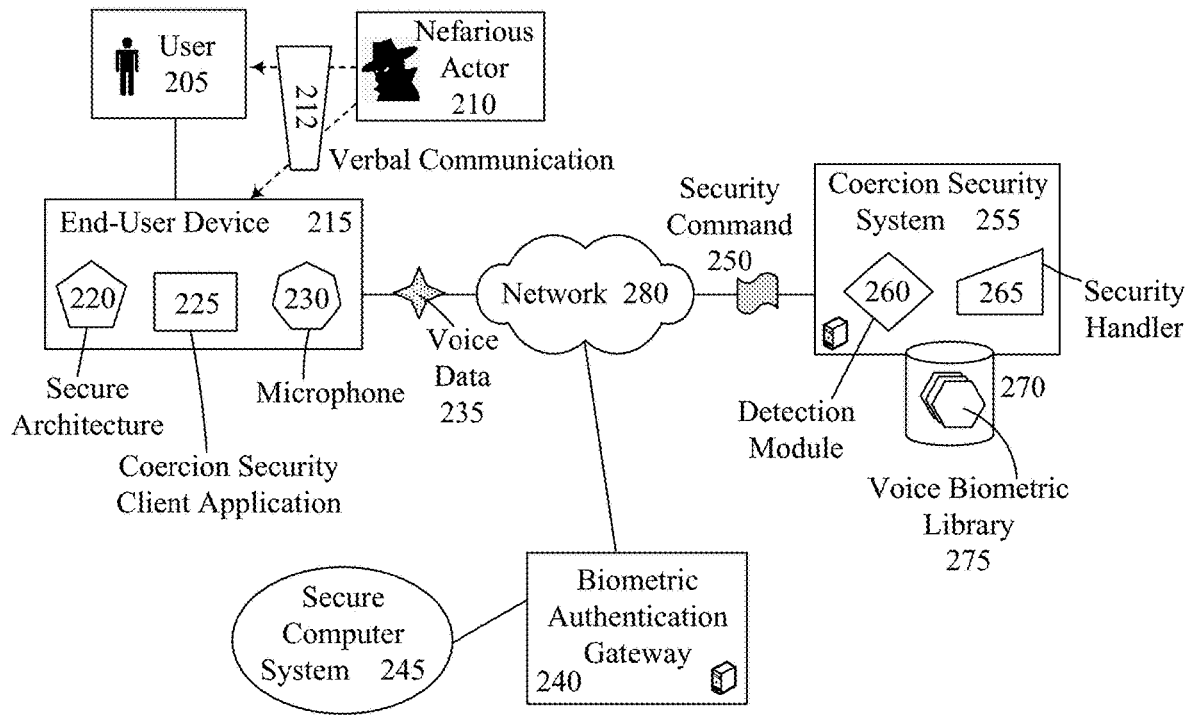
FIG. 2 is a block diagram of a system that implements a coercion security system for an end-user device in accordance with embodiments of the inventive arrangements disclosed herein.

FIG. 2 is a block diagram of a system 200 that implements a coercion security system 255 for an end-user device 215 in accordance with embodiments of the inventive arrangements disclosed herein. System 200 can be used within the context of method 100.

In system 200, a nefarious actor 210 can coerce a user 205 into providing with access to their secure end-user device 215, herein referred to as the end-user device 215, and, by extension, the secure computer system 245. This coercion can require the nefarious actor 210 and/or user 205 to engage in verbal communication 212.

The nefarious actor 210 can represent a person or persons who are not authorized to access the end-user device 215 and/or secure computer system 245. The term "nefarious actor", as used herein, can be used to distinguish this entity from the user 205, who is authorized to access the end-user device 215 and secure computer system 245, and other types of persons (e.g., a passerby, a coworker, etc.), as such an actor 210 has malicious or sinister motivations.

For example, a nefarious actor 210 can be a corporate mole trying to gain access to company or trade secrets stored by the secure computer system 245 for industrial sabotage. Alternately, the nefarious actor 210 can be an intelligence operative for a hostile entity attempting to gain prohibited information from the secure computer system 245.

The secure computer system 245 can represent one or more communicatively-linked computing devices running various software applications that provide the user 205 with access to a variety of services and/or data like the RISEN described in <HVSN2018012>. These services and/or data can be of a sensitive and/or specialized nature and may be unavailable to the general public and/or outside of the secure computer system 245.

As taught in <HVSN2018012>, access to the secure computer system 245 can be controlled using a biometric authentication gateway 240. The biometric authentication gateway 240 can be a remotely-located computing device configured to provide a multi-level biometrics-based security protocol for the end-user device 215 and to act as a validating authority for the user's 205 biometric data (not shown). Biometric authentication of the user's 205 biometric data by the biometric authentication gateway 240 can allow/deny access to the end-user device 215 and/or secure computer system 245.

Because biometric authentication is required for accessing the end-user device 215 and/or secure computer system 245, the nefarious actor 210 cannot successfully authenticate for direct access. Therefore, the nefarious actor 210 can resort to indirect access by coercing an authorized user 205 to gain access.

The end-user device 215 can be a computing device capable of network 280 communications including, but not limited to, a mobile device, a smartphone, a laptop computer, a desktop computer, a tablet computer, a notebook computer, and the like. The end-user device 215 can implement a secure architecture 220, as taught in <HVSN2017001> and <HVSN2017002>.

In another contemplated embodiment, the end-user device 215 can implement a computing architecture other than the secure architecture 220. Such an embodiment can provide significantly less security for the user 205 and/or secure computer system 245, and, cannot be recommended in good conscience.

In this embodiment of the present invention, the end-user device 215 can include a coercion security application 225 and a microphone 230. Additional components for other functionality can be included in the end-user device 215 without departing from the spirit of the present invention. For example, the end-user device 215 can include biometric sensors other than the microphone 230 to perform biometric authentication; these other biometric sensors can be extraneous for the focus of the present invention, and, therefore, have been excluded from the Figures.

The coercion security client application 225 can be a software program component of the coercion security system 255 that performs functions local to the end-user device 215. In particular, the coercion security application 225 can be configured to utilize the microphone 230 to capture verbal communication 212 proximate to the end-user device 215. It can be recommended that user 205 biometric authentication exclude the use of voice data 235 to avoid inadvertent confusion with the coercion security system 255.

The captured verbal communication 212 can then be conveyed as voice data 235 to a server component of the coercion security system 255. The voice data 235 can be of a predetermined format. The coercion security system 255 server can represent a computing device configured to process the received voice data 235 to detect the presence of the nefarious actor 210 and take one or more security commands 250 in response to their presence.

It should be noted that other system architectures for the coercion security system 255, other than the client-server system architecture presented in system 200, can be used with the present invention. For example, in another contemplated embodiment, the coercion security system can be implemented as a stand-alone software program that combines the functionality of the server component 255 and the client application 225. Resource/processing requirements of the coercion security system 255 and/or the capabilities of the end-user device 215 can influence the specific architecture used for implementation.

To perform its functions, the server 255 can utilize a detection module 260, a security handler 265, and a data store 270 housing a voice biometric library 275. The detection module 260 can be a software component configured to perform audio processing operations (e.g., noise reduction, amplification, equalization, etc.) on the voice data 235 to identify the voice sources (i.e., the speakers of the verbal communication 212). The detection module 260 can utilize the data of the voice biometric library 275 as part of the identification process. In addition to analyzing the voice data 235 biometrically, the detection module 260 can also be configured to look for specific words that would indicate coercive circumstances.

The voice biometric library 275 can be a collection of voice biometric data for authorized users 205 of the coercion security system 255. Authorized users 205 can be required to submit voice biometric data to the voice biometric library 275 as part of a registration process with the coercion security system 255.

In one embodiment, multiple users 205 can be associated with a single end-user device 215 (i.e., a shared resource). In another embodiment, the user 205 of the end-user device 215 can designate other persons not registered with the coercion security system 255 as not nefarious actors 210 to avoid false positives; these designated persons can be required to provide voice biometric data for the voice biometric library 275.

In an even more robust embodiment, the voice biometric library 275 can be expanded to include voice biometric data for known nefarious actors 210. Such an embodiment can provide the user 205 and/or an appropriate response agency with an exact identity of the nefarious actor 210. Further, the voice biometric library 275 can include security commands 250 specific to an identified nefarious actor 210.

In yet another embodiment, the coercion security system 255 can use a section of the voice biometric library 275 to collect voice data 235 for unknown/unidentified speakers for later categorization and/or cross-reference with other agencies.

When the presence of an unauthorized user or nefarious actor 210 is ascertained by the detection module 260, the security handler 265 can be activated to determine which security commands 250 should be executed by the end-user device 215 and/or server 255. A security command 250 can represent an action that is performed on behalf of the user 205 to address the coercion by the nefarious actor 210. Selection of the security commands 250 by the security handler 265 can include predefined and user-configurable actions.

Examples of security commands 250 can include, but are not limited to, powering down the end-user device 215, allowing the end-user device 215 to remain powered and tracking its location, requesting identity validation of an unauthorized user from the authorized user 205, limiting the functions that are executable by the end-user device 215, notifying a designated person or agency of the coercion, and the like. The security commands 250 can be tailored to meet the needs of a particular customer of the coercion security system 255.

As used herein, presented data store 270 can be a physical or virtual storage space configured to store digital information. Data store 270 can be physically implemented within any type of hardware including, but not limited to, a magnetic disk, an optical disk, a semiconductor memory, a digitally encoded plastic memory, a holographic memory, or any other recording medium. Data store 270 can be a stand-alone storage unit as well as a storage unit formed from a plurality of physical devices. Additionally, information can be stored within data store 270 in a variety of manners. For example, information can be stored within a database structure or can be stored within one or more files of a file storage system, where each file may or may not be indexed for information searching purposes. Further, data store 270 can utilize one or more encryption mechanisms to protect stored information from unauthorized access.

Network 280 can include any hardware/software/and firmware necessary to convey data encoded within carrier waves. Data can be contained within analog or digital signals and conveyed though data or voice channels. Network 280 can include local components and data pathways necessary for communications to be exchanged among computing device components and between integrated device components and peripheral devices. Network 280 can also include network equipment, such as routers, data lines, hubs, and intermediary servers which together form a data network, such as the Internet. Network 280 can also include circuit-based communication components and mobile communication components, such as telephony switches, modems, cellular communication towers, and the like. Network 280 can include line based and/or wireless communication pathways.

Figure 3:
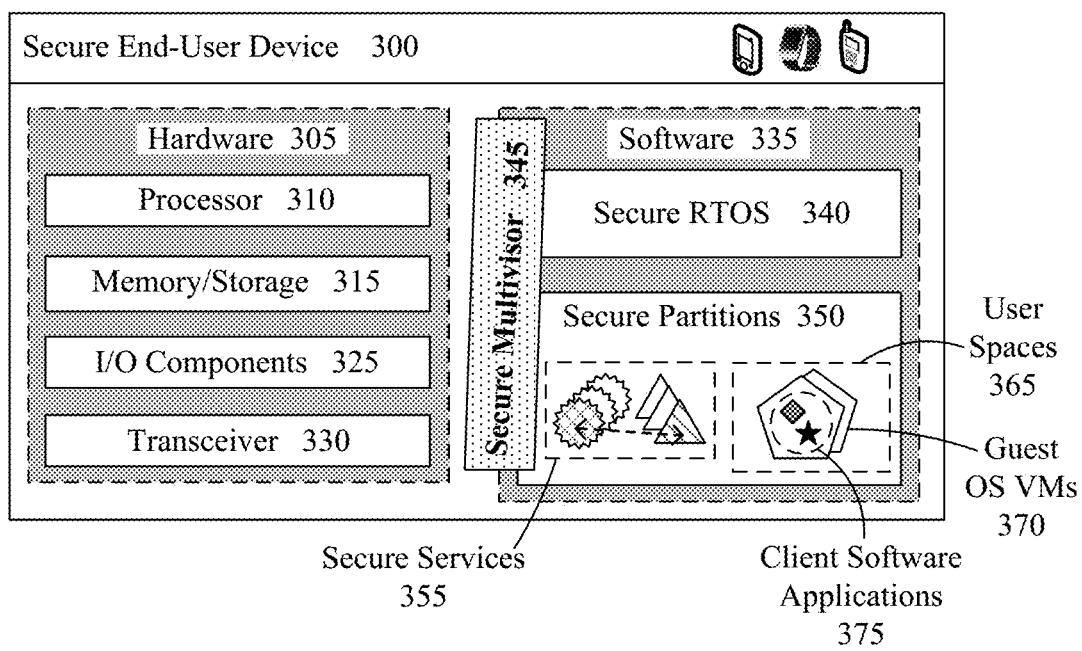
FIG. 3 is a schematic diagram of a secure end-user device that implements the secure architecture in accordance with embodiments of the inventive arrangements disclosed herein.

FIG. 3 is a schematic diagram of a secure end-user device 300 that implements the secure architecture in accordance with embodiments of the inventive arrangements disclosed herein. The secure end-user device 300 can be used within the context of method 100 and/or system 200.

The secure end-user device 300 can be comprised of hardware 305 and software 335 components. The hardware 305 can include one or more processors 310, memory and storage 315, input/output (I/O) components 325, a transceiver 330, and the like. A processor 310 can refer to a central processor unit (CPU) that executes the machine-readable instructions of software 335 by performing arithmetical, logical, and input/output operations. Multiple processor 310 components can be used to increase computing power and distribute load. Further, specialized or dedicated processors 310 or processor 310 areas can be used to handle specific functions, such as a secure area of a main processor 310 for creating a Trusted Execution Environment (TEE).

The memory/storage 315 can be used to store the machine-readable instructions of software 335. Memory/storage 315 can include volatile and non-volatile elements as well as non-transitory and removable media.

The I/O components 325 can represent a variety of means for receiving input data and presenting output data. Examples of I/O components 325 can include, but are not limited to, a microphone, a speaker, a display, a keyboard, a touchscreen, a digital camera, biometric sensors, and the like. The I/O components 325 included in the secure end-user device 300 can support the functions of the software 335 and/or secure services 355.

The transceiver 330 can be a component able to wirelessly transmit and receive data. Multiple transceivers 330 can be included in the secure end-user device 300 to allow multiple means of connectivity. In such an embodiment, the secure end-user device 300 can be configured to utilize available communications networks in accordance with predefined rules and/or user-configured preferences.

The software 335 components of the secure end-user device 300 can represent the machine-readable instructions that are stored in the memory/storage 315 and cause the secure end-user device 300 to perform various tasks when executed by the processor 310. The primary software 335 components can include a secure real-time operating system (RTOS) 340, a secure multivisor 345, and secure partitions 350.

The secure RTOS 340 can represent the system program that manages the resources, hardware 305 and software 335, of the secure end-user device 300 and provides common services for the secure multivisor 345 and secure partitions 350. The INTEGRITY RTOS can be the preferred secure RTOS 310. In other embodiments, a less secure operating system like ANDROID or iOS can be used lieu of the secure RTOS 340 to implement the secure architecture with a lesser overall degree of intrusion security due to inherent vulnerabilities.

The secure multivisor 345 can represent the hardware and/or software components necessary to create and manage virtualizations, the secure partitions 350, like the INTEGRITY MULTIVISOR. In the Art, other terms for the secure multivisor 345 can be hypervisor or virtual machine monitor (VMM). The secure partitions 350 can be virtual containers that separate functions and/or data. Each secure partition 350 can have its own set of dedicated hardware 305 resources; this hardware 305 separation can be enforced by the secure multivisor 345 as well as a feature of the processor 310.

The secure partitions 350 can be used to host the local secure services 355, including their corresponding critical data, and user spaces 365. The secure services 355 can represent core features and value-added services that improve and support security of the end-user device 300. Examples of secure services 355 can include, but are not limited to, a secure keyboard, a session manager, firewall and/or proxy services, encryption services, a password manager, threat analysis, intrusion detection, a golden image service, a content storage service, a coercion security service, and the like.

A user space 365 secure partition 350 can be used to host a virtual machine (VM) 370 running a guest operating system (OS). The guest OS can be different than the secure RTOS 340, such as ANDROID OS. The user of the secure end-user device 300 can install various client software applications 375 within the guest OS VM 370.

Multiple guest OS VMs 370 can be instantiated on the secure end-user device 300. The guest OSes can be the same or different. In this situation, each guest OS VM 370 can represent the logical and functional separation of personal client software applications 375 from business or enterprise client software applications 375. This separation can further improve the security for enterprise applications 375 as failures or compromises perpetrated by personal client software applications 375 cannot affect the enterprise client software applications 375.

Further, multiple enterprise guest OS VMs 370 can operate on the secure end-user device 300, representing distinct sets of enterprise client software applications 375. In such a situation, the secure services 355 can apply different security policies to each enterprise guest OS VM 370. That is, one enterprise guest OS VM 370 can be more restricted (have a greater degree of security) than the other. Such an approach can allow for enterprise client software applications 375 that require a greater level of security to operate without over-restricting other applications 375.

In another embodiment, a user space 365 running a guest OS VM 370 can be used to virtualize peripheral device drivers to other guest OS VMs 370 to avoid redundant virtualizations of the peripheral device drivers in multiple user spaces 365.

In essence, the typical user environment experienced when using a smartphone can be virtualized in the user space 365 secure partition 350. When a client software application 375 or the VM 370 needs to interact with the secure RTOS 340, the interaction can be first scrutinized by the appropriate secure services 355. Requested interactions of specific privilege levels can require immediate biometric verification of the user via a biometric security service 355 and corresponding biometric authentication gateway. Because the user space 365 is isolated from the secure RTOS 340 and other secure partitions 350, any compromised client software applications 375 used in the user space 365 cannot affect the data and/or processes of the other secure partitions 350 and/or the secure RTOS 340.

Figure 4:
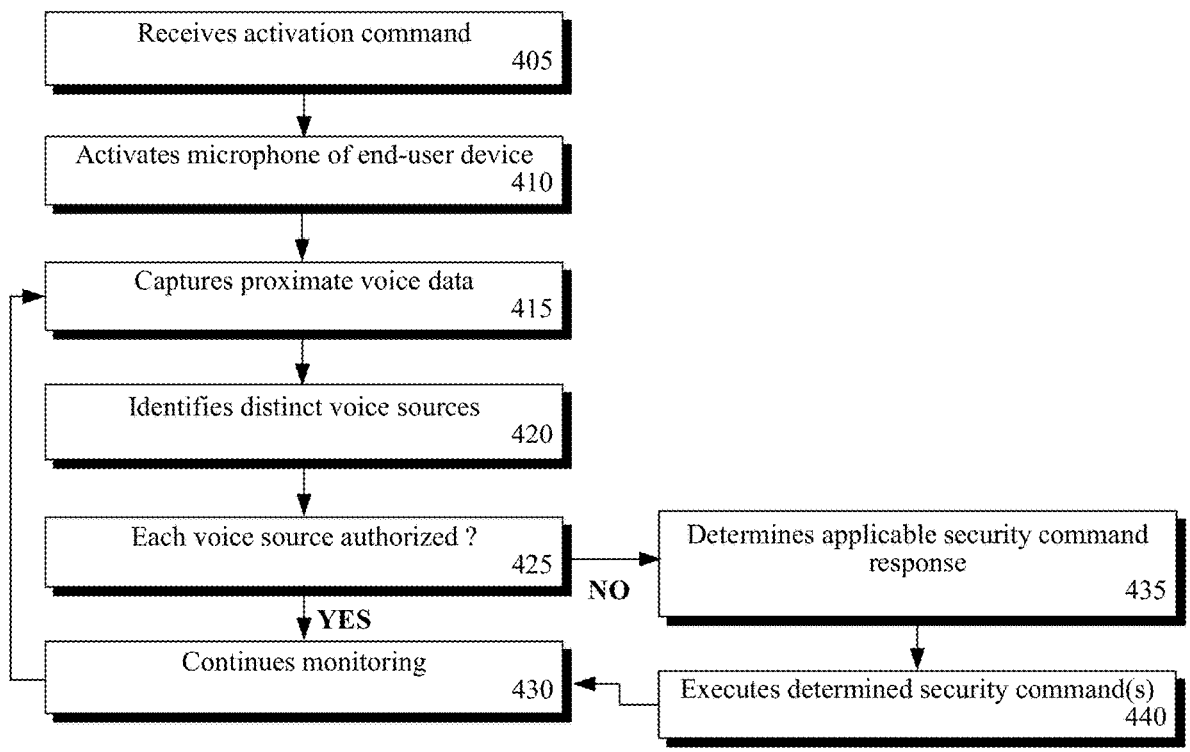
FIG. 4 is a flowchart of a method detailing the operation of the coercion security system in accordance with embodiments of the inventive arrangements disclosed herein.

FIG. 4 is a flowchart of a method 400 detailing the operation of the coercion security system in accordance with embodiments of the inventive arrangements disclosed herein. Method 400 can be performed within the context of the previous Figures.

Method 400 can begin with step 405 where the coercion security system receives an activation command. The microphone of the user's end-user device can then be activated in step 410. In step 415, voice data (i.e., verbal communications) proximate to the end-user device can be captured. The frequency in which voice data is captured as well as the time length of the voice data can vary based on factors such as available device resources and processing requirements.

For example, a twenty second audio clip can be captured every sixty seconds. Alternatively, capture can occur only when speech is detected, in order to not waste resources processing periods of silence.

The voice can then be analyzed to identify the distinct voice sources in step 420. In step 425, it can be determined if each identified voice source is authorized for the end-user device. When all the voice sources are authorized for the end-user device, monitoring of the proximate audio can continue in step 430, returning the flow of method 400 to step 415.

When one or more of the voice sources are not authorized or unknown, step 435 can be performed where the applicable security command response is determined. The determined security command or commands can be executed in step 440. From step 440, method 400 can proceed to step 430 to continue monitoring, returning to step 415 until the end-user device and/or coercion security system is deactivated or monitoring is suspended.

The diagrams in the Figures illustrate the architecture, functionality, and operation of possible implementations of systems and methods according to various embodiments of the present invention. It will also be noted that each block of the block diagrams and combinations of blocks in the block diagrams can be implemented by special purpose hardware-based systems that perform the specified functions or acts, or combinations of special purpose hardware and computer instructions.

What is claimed is:

1. A system comprising:
   a secure computer system accessed via a biometric authentication gateway, wherein said secure computer system hosts a plurality of secure services and sensitive data;
   a network-enabled secure end-user device utilizing a secure device architecture that requires successful biometric authentication of an authorized user by the biometric authentication gateway for functions of the secure end-user device and the plurality of secure services and sensitive data of the secure computer system to be accessed, wherein said secure device architecture encapsulates software programs requiring a similar security level into distinct partitions to prevent intrusions between software programs of different partitions, wherein each partition is allocated a distinct set of dedicated device resources; and a coercion security system having an application running on the secure end-user device configured to capture and analyze verbal communication proximate to the secure end-user device to address coercion of the authorized user by a nefarious actor to access at least one of the secure computer system and the secure end-user device, wherein, without coercion of the authorized user, said nefarious actor is unable to access the secure end-user device and the secure computer system, wherein the coercion security system comprises a coercion security server to:

analyze voice data captured by the application running on the secure end-user device;

determine an identity of the nefarious actor based on the analyzed voice data; and select, from among a plurality of security commands associated with identities of different nefarious actors, at least one security command that is associated with the identity of the nefarious actor, wherein the coercion security system executes the selected at least one security command upon the secure end-user device in response to detected coercion.

2. The system of claim 1, wherein, to increase security of the secure end-user device, said secure end-user device is configured to run a secure real-time operating system (RTOS), wherein the secure RTOS is INTEGRITY.

3. The system of claim 1, wherein biometric data used for biometric authentication of the authorized user excludes voice-based data.

4. The system of claim 1, wherein the coercion security system further comprises:

a voice biometric library containing voice biometric data for the authorized user, wherein the coercion security server analyzes the voice data captured by the application running on the secure end-user device using the voice biometric library.

5. The system of claim 4, wherein the voice biometric library includes a record of voice biometric data for the nefarious actor.

6. The system of claim 4, wherein the coercion security system is a secure service provided by the secure computer system.

7. The system of claim 4, wherein the coercion security server further comprises:

a detection module configured to determine distinct voice sources within the voice data and identify if each determined distinct voice source belongs to the authorized user or the nefarious actor using the voice biometric library; and a security handler configured to ascertain the selected at least one security command for execution on the secure end-user device based upon the determination of the detection module.

8. The system of claim 1, wherein the selected at least one security command comprises at least one of power down the secure end-user device, allow the secure end-user device to remain powered and track its location, request identity validation of an unauthorized user from the authorized user, limit the functions that are executable by the secure end-user device, and notify a designated person or agency.

9. A method for addressing user coercion comprising:

while a secure end-user device is being accessed, monitoring of verbal communications made proximate to the secure end-user device by a client application of a coercion security system for a presence of an unauthorized user, wherein voice biometric data for authorized users of the secure end-user device is collected in a voice biometric library during registration with the coercion security system, wherein the secure end-user device implements a secure device architecture that encapsulates software programs requiring a similar security level into distinct partitions to prevent intrusions between software programs of different partitions, wherein each partition is allocated a distinct set of dedicated device resources, wherein access to the secure end-user device is controlled by biometric authentication of the authorized user, prohibiting direct access to the secure end-user device by the unauthorized user;

when the presence of the unauthorized user is detected in voice data corresponding to the verbal communications, determining at least one security command to address potential coercion of the authorized user by the unauthorized user, wherein determining the at least one security command includes:

determining an identity of the unauthorized user based on the voice data; and selecting, from among a plurality of security commands associated with identities of different unauthorized users, the at least one security command that is associated with the identity of the unauthorized user; and executing the selected at least one security command on the secure end-user device.

10. The method of claim 9, wherein monitoring verbal communications further comprises:

capturing the proximate verbal communications as the voice data using a microphone component of the secure end-user device;

analyzing the captured voice data to identify distinct voice sources;

correlating each voice source to an authorized user of the secure end-user device based upon contents of a voice biometric library, wherein said voice biometric library at least includes the voice biometric data of authorized users of the secure end-user device; and when a voice source fails to correlate to an authorized user of the secure end-user device, denoting the voice source as belonging to an unauthorized user and indicating the presence of an unauthorized user.

11. The method of claim 10, wherein correlating authorized user voice sources further comprises:

identifying the voice biometric data of all authorized users for the secure end-user device within the voice biometric library;

comparing the voice data that corresponds to each voice source to the identified voice biometric data for all authorized users; and when the voice data of a voice source matches the voice biometric data of one of the authorized users, denoting the voice source as belonging to an authorized user.

12. The method of claim 10, wherein the voice biometric library further includes voice biometric data for known nefarious actors, said method further comprises:

for each voice source denoted as belonging to an unauthorized user, comparing the voice data corresponding to said each voice source to the voice biometric data in the voice biometric library for the known nefarious actors; and when the voice data of the voice source matches the voice biometric data of a known nefarious actor, denoting the voice source as belonging to the known nefarious actor, wherein a likelihood of the potential coercion of the authorized user is increased.

13. The method of claim 11, wherein voice sources denoted as belonging to unauthorized users are stored by the coercion security system for at least one of future identification and addition to the voice biometric library.

14. The method of claim 9, wherein the selected at least one security command comprises at least one of power down the secure end-user device, allow the secure end-user device to remain powered and track its location, request identity validation of an unauthorized user from the authorized user, limit the functions that are executable by the secure end-user device, and notify a designated person or agency.

15. A non-transitory computer readable storage medium having computer usable program code embodied therewith, the computer usable program code, when executed by a processor, causing the processor to:
in response to an activation command, monitor verbal communications made proximate to a secure end-user device for a presence of an unauthorized user, wherein voice biometric data for authorized users of the secure end-user device is collected in a voice biometric library during a registration process, wherein the secure end-user device implements a secure device architecture that encapsulates software programs requiring a similar security level into distinct partitions to prevent intrusions between software programs of different partitions, wherein each partition is allocated a distinct set of dedicated device resources, wherein access to the secure end-user device is controlled by biometric authentication of the authorized user, prohibiting direct access to the secure end-user device by the unauthorized user;
when the presence of the unauthorized user is detected in voice data corresponding to the verbal communications, determine an identity of the unauthorized user based on the voice data, and select, from among a plurality of security commands associated with identities of different unauthorized users, at least one security command that is associated with the identity of the unauthorized user to address potential coercion of the authorized user by the unauthorized user; and
execute the selected at least one security command on the secure end-user device.

16. The non-transitory computer readable storage medium of claim 15, wherein monitoring verbal communications further comprises the processor executing the computer usable program code to:
activating a microphone component of the secure end-user device to capture the proximate verbal communications as the voice data using the microphone component of the secure end-user device;
analyzing the captured voice data to identify distinct voice sources;
correlating each voice source to an authorized user of the secure end-user device based upon the voice biometric library; and
when a voice source fails to correlate to an authorized user of the secure end-user device, denoting the voice source as belonging to the unauthorized user and indicate the presence of the unauthorized user.

17. The non-transitory computer readable storage medium of claim 16, wherein correlating authorized user voice sources further comprises the processor executing the computer usable program code to:
identifying the voice biometric data of all authorized users for the secure end-user device within the voice biometric library;
comparing the voice data that corresponds to each voice source to the identified voice biometric data for all authorized users; and
when the voice data of a voice source matches the voice biometric data of one of the authorized users, denoting the voice source as belonging to an authorized user.

18. The non-transitory computer readable storage medium of claim 16, wherein the voice biometric library further includes voice biometric data for known nefarious actors, and wherein the non-transitory computer readable storage medium includes computer usable program code that, when executed by the processor, causes the processor to:
for each voice source denoted as belonging to an unauthorized user, compare the voice data corresponding to said each voice source to the voice biometric data in the voice biometric library for the known nefarious actors; and
when the voice data of the voice source matches the voice biometric data of a known nefarious actor, denote the voice source as belonging to the known nefarious actor, wherein a likelihood of the potential coercion of the authorized user is increased.

19. The non-transitory computer readable storage medium of claim 18, wherein voice sources denoted as belonging to unauthorized users are stored for at least one of future identification and addition to the voice biometric library.

20. The non-transitory computer readable storage medium of claim 15, wherein the selected at least one security command comprises at least one of power down the secure end-user device, allow the secure end-user device to remain powered and track its location, request identity validation of an unauthorized user from the authorized user, limit the functions that are executable by the secure end-user device, and notify a designated person or agency.

* * * * *